United States Patent
Mori et al.

[11] Patent Number: 5,687,995
[45] Date of Patent: Nov. 18, 1997

[54] SHAPE MEMORY ALLOY PIPE COUPLING AND UNDERWATER PIPES

[75] Inventors: Takanobu Mori, Hitachi; Yasuo Kondo, Katsuta; Hiroshi Satoh, Hitachi; Shigeo Hattri, Ibaraki-ken; Takahiko Kato, Katsuta; Yoshimi Yanai, Hitachi, all of Japan

[73] Assignee: Hitachi, Ltd., Tokyo, Japan

[21] Appl. No.: 644,566

[22] Filed: May 10, 1996

Related U.S. Application Data

[63] Continuation of Ser. No. 267,830, Jun. 29, 1994.

[30] Foreign Application Priority Data

Jun. 30, 1993 [JP] Japan .................. 5-161561

[51] Int. Cl.[6] ...................................... F16L 35/00
[52] U.S. Cl. .................. 285/21; 285/381.2; 285/417; 156/86; 29/449
[58] Field of Search ................ 285/381–381.2, 285/21, 242, 417, 55, 916; 156/86; 219/535, 544; 29/447, 515, 516; 138/143, 145, 146, 140; 428/34.1, 614, 615, 549, 586, 685; 148/402

[56] References Cited

U.S. PATENT DOCUMENTS

| | | | |
|---|---|---|---|
| 3,689,114 | 9/1972 | Meserole | 285/353 X |
| 3,898,369 | 8/1975 | Clabburn | 138/145 X |
| 4,135,743 | 1/1979 | Hughes | 285/381 X |
| 4,141,705 | 2/1979 | Stenvall et al. | 420/584 |
| 4,245,674 | 1/1981 | Nakamura et al. | 285/382.1 X |
| 4,276,909 | 7/1981 | Biscop | 29/447 X |
| 4,281,841 | 8/1981 | Kim et al. | 285/381 X |
| 4,304,613 | 12/1981 | Wang et al. | 148/11.5 N |
| 4,310,183 | 1/1982 | Szalvay | 285/381 X |
| 4,314,718 | 2/1982 | Broyles et al. | 2850/381 X |
| 4,469,357 | 9/1984 | Martin | 285/381 |
| 4,518,444 | 5/1985 | Albrecht et al. | 428/615 X |
| 4,624,879 | 11/1986 | Van Dijck et al. | 285/381 X |
| 4,832,382 | 5/1989 | Kapgan | 285/381 X |
| 4,946,644 | 8/1990 | Schumacher et al. | 420/56 |
| 4,960,470 | 10/1990 | Honkura et al. | 148/12.4 X |
| 5,265,919 | 11/1993 | Takemoto et al. | 285/381 |

FOREIGN PATENT DOCUMENTS

| | | |
|---|---|---|
| A-0030119 | 6/1981 | European Pat. Off. . |
| A-0255787 | 2/1988 | European Pat. Off. . |
| A-3544127 | 6/1987 | Germany . |
| A-3544128 | 6/1987 | Germany . |
| 192543 | 8/1989 | Japan . |
| 300495 | 10/1992 | Japan . |

OTHER PUBLICATIONS

Table F156 from *CRC Handbool of Chemistry and Physics* 59th Edition, 1978–79.
Published paper in Furukawa Denko Review, No. 88, pp. 23–28, Jun. 1991 by Horikawa et al.

*Primary Examiner*—Terry Lee Melius
*Assistant Examiner*—Heather Shackelford
*Attorney, Agent, or Firm*—Bardehle, Pagenberg, Dost, Altenburg, Frohwitter, Geissler

[57] ABSTRACT

A shape memory alloy pipe coupling in the present invention for joining two pipes, the pipe coupling comprising a tube of a shape memory alloy, and a cover of stainless steel having a sufficient thickness and having high corrosion resistance for covering the tube. The shape memory alloy is enclosed by the cover of high corrosion-resistant stainless steel, by which high-temperature water can be prevented from making the shape memory alloy brittle and from corroding and damaging the shape memory alloy particularly through galvanic corrosion even in the case where such high-temperature water exists in the inside or outside of the pipes.

15 Claims, 5 Drawing Sheets

SHAPE MEMORY ALLOY PIPE COUPLING AND UNDERWATER PIPES

This is a continuation of co-pending application Ser. No. 08/267,830, filed on Jun. 29, 1994.

BACKGROUND OF THE INVENTION

The present invention relates to a shape memory alloy pipe coupling adapted to pipe joining under water and particularly to a high corrosion-resistant shape memory alloy pipe coupling suitable as a pipe coupling used in a position where welding is hardly carried out, and an underwater pipe arrangement utilizing such a pipe coupling.

In the case where pipes are joined, welding is generally used. In the case off welding, however, not only a large space is required for a welding apparatus and for a worker but also a large time is required for welding work. In the case of a pipe coupling using a shape memory alloy, however, not only the required space is reduced but also the time required for pipe joining is shortened, compared with the case of welding. A Ti-Ni alloy is widely used as a shape memory alloy for such a pipe coupling, because the Ti-Ni alloy is excellent in shape recovery capability. The Ti-Ni alloy may be however inferior to stainless steel in corrosion resistance under water.

As a conventional technique with respect to such a shape memory alloy pipe coupling, a pipe coupling for joining high-temperature water pipes in an atomic power plant is described in a paper by Hiroshi Horikawa, Yuichi Suzuki, Akira Horie, Shinji Yamamoto and Yuji Yasuda in Furukawa Denko Review, No. 88, pp. 22–28, June 1991. In the pipe coupling, a structure in which a stainless steel tube is disposed between a shape memory alloy and a water pipe is employed in order to prevent water from leaking through a pipe joint into the shape memory alloy. The pipe coupling is however applied only to the case where water flows in the inside of the pipes.

On the other hand, JP-A 1-192543 discloses an anti-corrosion shape memory alloy for repairing local cracking in a heat-transfer pipe for heat exchanger. In the JP-A 1-192543, use of the shape memory alloy under water is considered but the shape memory alloy is of the type in which a sleeve of an anti-corrosion shape memory alloy is inserted in the inside of the pipe. JP-A 4-300495 discloses an Ni-P alloy or Cu alloy coating which is formed on a pipe coupling of a shape memory alloy by electroless plating for the purpose of preventing peeling or cracking even at the time of shrinking of the shape memory alloy by heating.

Each of U.S. Pat. Nos. 4,310,183 and 4,314,718 discloses the case where a cover is provided. In the U.S. Pat. Nos. 4,310,183 and 4,314,718, however, not only the material for the cover is not clear but also the cover is provided not integrally.

SUMMARY OF THE INVENTION

Among those conventional techniques, the technique described in Furukawa Denko Review No. 88, pp. 23–28, June 1991, has a structure in which the shape memory alloy tube may be in contact with water in the outside of the pipes though there is no consideration of the case where corrosive water is present in the outside of the pipes. Accordingly, when this technique is applied, for example, to pipes in an underwater apparatus or pipes in a reactor pressure vessel, that is, when the technique is applied to pipes in the presence of water in the inside or outside of the pipes, there is a risk that hydrogen attack, pitting corrosion, crevis corrosion, stress corrosion cracking and so on may occur in the shape memory alloy in use and that galvanic corrosion may occur between different kinds of metals at a contact area between the shape memory alloy tube and a stainless steel tube. Finally, there is a risk that the function of the pipe coupling may become lost because of the progress of cracking.

Among the aforementioned conventional techniques, the technique described in JP-A 1-192543 has a structure in which a shape memory alloy tube is inserted in the inside of a pipe. Further, the tube is provided as a sleeve for repairing the cracking portion of the pipe but not provided as a pipe coupling. When the technique with respective to such a repairing sleeve is applied to a place where water flows in the inside of the pipe, there is a risk that the flow rate of water in the inside of the pipe may become insufficient because the size of a flow passage is reduced correspondingly to the provision of the sleeve. Among the aforementioned conventional techniques, the technique described in JP-A 4-300495 has no consideration of galvanic corrosion between different kinds of metals at a contact area between the shape memory alloy tube and a stainless steel tube in the case where the technique is applied to an underwater pipe arrangement in which water is present in the inside or outside of the pipe.

The present invention relates to a pipe coupling adapted to a place where it is difficult to weld pipes, and an object of the present invention is to provide a pipe coupling of a shape memory alloy which is free from a risk that the shape memory alloy is embrittled or corroded even in the case where the pipe coupling is used in the environment of presence of corrosive water in the inside or outside of the pipes after the pipe coupling is joined to the outside of the pipes, and to provide an underwater pipe arrangement using the aforementioned shape memory alloy pipe coupling.

In the present invention, a tube made of a shape memory alloy is enclosed by a sufficiently thick cover such as cylindrical container or coating made of a corrosion-resistant alloy for covering the whole surface of the shape memory alloy tube so that a corrosive fluid such as water is not directly in contact with the shape memory alloy. Further, the corrosion-resistant alloy of the container or coating is selected to be similar in kind with the 42 material for the pipes in order to prevent galvanic corrosion. Further, the pipe coupling is formed so as to be disposed on the outside of the pipes.

That is, according to an aspect of the present invention, there is provided a shape memory alloy pipe coupling comprising a tube made of a shape memory alloy and having a diameter which is shrunk by heating, and a cover for covering the whole surface of the shape memory alloy tube and made of a material identical in kind with the material for a pair of unit pipes to be joined, in which opposite end portions of the pair of unit pipes are tightened from the outside through the shape memory alloy tube covered with the cover so that the pair of pipes are joined to each other.

According to another aspect of the present invention, there is provided a shape memory alloy pipe coupling comprising a tube made of a shape memory alloy and having a diameter which is shrunk by heating, and a cover for covering the whole surface of the shape memory alloy tube, the cover having an inner diameter substantially equal to the outer diameter of unit pipes to be joined, the cover having an inner surface formed as a surface being in contact with the unit pipes, the cover being made of a material identical with the material for the unit pipes.

In the shape memory alloy pipe coupling according to the present invention, the cover is constituted by a double tube for enclosing the shape memory alloy tube therein, the double tube having an inner tube portion being in contact with the inner surface of the shape memory alloy tube and an outer tube portion formed so as to be alienated from the outer surface of the shape memory alloy tube so that the inner tube portion can be deformed in accordance with the deformation of the shape memory alloy tube.

In the shape memory alloy pipe coupling according to the present invention, heating means is provided so as to be adjoin to the outer surface of the tube provided in the inside of the cover or the cover containing a double tube.

In the shape memory alloy pipe coupling according to the present invention, the cover is constituted by a coating having a thickness in a range of from 0.1 mm to 10 mm for covering the whole surface of the shape memory alloy tube, the thickness of the cover being sufficiently smaller than the thickness of the shape memory alloy tube.

In the shape memory alloy pipe coupling according to the present invention, there is provided a supporting tube disposed on inner circumferential surface of the shape memory alloy tube on the whole surface of which is covered with the cover and having an inner diameter substantially equal to the outer diameter of the pipes to be joined.

In the shape memory alloy pipe coupling according to the present invention, the inner tube portion of the double tube which is a member coming in contact with the unit pipes to be joined is formed so as to be long in the axial direction so that a pair of tubes each made of the aforementioned shape memory alloy and covered with the cover are provided substantially in opposite ends of the inner tube portion in the axial direction.

In the shape memory alloy pipe coupling according to the present invention, the supporting tube which is a member coming in contact with the unit pipes to be joined is formed so as to be long in the axial direction so that a pair of tubes each made of the aforementioned shape memory alloy and covered with the cover are provided substantially in opposite ends of the inner tube portion in the axial direction.

In the shape memory alloy pipe coupling according to the present invention, each of the cover, supporting tube and unit pipes to be joined is made of stainless steel.

In the shape memory alloy pipe coupling according to the present invention, each of the cover and supporting tube is made of austenitic stainless steel containing carbon in a range of from 0.001% by weight to 0.03% by weight.

In the shape memory alloy pipe coupling according to the present invention, the thickness of the tube made of a shape memory alloy is selected to be in a range of from 2 mm to 20 mm.

In the shape memory alloy pipe coupling according to the present invention, the thickness of the cover is selected to be in a range of from 0.1 mm to 10 mm, preferably in a range of from 0.5 mm to 5 mm, so as to be smaller than the thickness of the shape memory alloy tube so that the cover can be deformed in accordance with the deformation of the tube.

According to a further aspect of the present invention, there is provided an underwater pipe arrangement using a pipe coupling for tightening and joining unit pipes of the same diameter from the outside therethrough, wherein the pipe coupling is constituted by a shape memory alloy pipe coupling described in any one of the aforementioned paragraphs.

According to a further aspect of the present invention, there is provided an underwater pipe arrangement using a pipe coupling for tightening and joining stainless steel unit pipes of the same diameter from the outside therethrough and disposed in the presence of water in the inside or outside of the unit pipes, wherein the pipe coupling is constituted by a shape memory alloy pipe coupling including a tube made of a shape memory alloy and having a diameter which is shrunk by heating and a thickness in a range of from 2 mm to 20 mm, and a cover for covering the whole surface of the shape memory alloy tube and made of austenitic stainless steel containing carbon in range of from 0.001% by weight to 0.03% by weight and having a thickness in a range of from 0.1 mm to 5 mm.

In a pipe coupling having a structure in which a tube of a shape memory alloy is enclosed by a cover of stainless steel such as a container or a coating having a sufficient thickness as a structural material, water especially high-temperature water is not directly in contact with the shape memory alloy. Accordingly, there is no risk of hydrogen embrittlement of the shape memory alloy though water contains hydrogen. Further, the shape memory alloy is prevented from pitting corrosion, stress corrosion cracking and so on, so that high reliability on the pipe coupling for connecting pipes is obtained.

In a pipe coupling having a structure in which a shape memory alloy is enclosed by a stainless steel cover such as a container or a coating, there is no risk of galvanic corrosion caused by contact between different kinds of metals even in the case where there is a difference in corrosion potential between the stainless steel and the shape memory alloy because the member coming in contact with the unit pipes to be joined is the cover made of a material identical with the material for the unit pipes. Further, the shape memory alloy is prevented from crevis corrosion. As a result, reliability on the pipe coupling is improved.

When the shape memory alloy pipe coupling is heated after it is mounted onto plant pipes, the inner diameter of the shape memory alloy tube is shrunk by several % so that tightening force acts on the unit pipes in the inside of the shape memory alloy tube. This function of the pipe coupling is fulfilled by this tightening force. In the case of a metallic material shown in Table 1 (which will be described later), the temperature range in which the shape memory alloy tube is shrunk by heating is from 30° C. to 150° C. If an exclusive-use heater as means for heating the shape memory alloy tube to the temperature range is mounted onto the outer surface of the shape memory alloy tube, heating is made easy. When such an exclusive-use heater is disposed between the outer circumferential surface of the shape memory alloy tube and the inner surface of the austenitic stainless steel container, heat conduction efficiency is improved. When a temperature sensor such as a thermocouple is disposed between the exclusive-use heater and the shape memory alloy tube, the temperature obtained by heating can be controlled accurately.

In case that the exclusive-heater is not disposed on the shape memory alloy pipe coupling, the shape memory alloy pipe coupling is heated by a heating means from the outside so that it can be restored to memorized original shape. As the heating means from the outside, there can be used: a method of covering only the coupling portion locally so as to be heated and heating by introducing a heated gas or a heated water vapor to the aforementioned portion; or a high frequency-heating method of heating only the coupling portion locally; or a method of heating by rolling a sheathed heater on the outer circumferential surface of the coupling portion; or a method of heating by contacting two halved cylindrical heater on the outer circumferential surface of the coupling portion.

By selecting the thickness of the stainless steel cover such as a container or a coating to be sufficiently large, high corrosion resistance is obtained. It is however preferable that the thickness of the stainless steel container or coating is selected to be sufficiently small in a range in which not only the tightening function of the shape memory alloy hollow tube is effective but the corrosion resistance thereof is effective. That is, it is preferable that the thickness of the stainless steel container or coating is smaller than the thickness of the shape memory alloy tube and not larger than one fourth the thickness of the shape memory alloy tube in order to obtain a sufficient thickness. Accordingly, it is necessary that the thickness of the cover is not smaller than 0.1 mm in order to protect the surface thereof from corrosion. If the thickness is selected to be not smaller than 5 mm, the shrinking force of the shape memory alloy acting on the pipes to be joined is suppressed so that the function of the pipe coupling is lowered. Accordingly, it is undesirable that the thickness is selected to be not smaller than 5 mm. It is particularly preferable that the thickness of the cover is selected to be not larger than 1.5 mm, more preferably, in a range of from 0.3 mm to 1.5 mm.

It is necessary that the inner tube of the stainless steel cover is shrunk in accordance with the shrinkage of the shape memory alloy when the inner diameter of the shape memory alloy tube is shrunk. When the length of the inner tube of the stainless steel cover is selected to be larger than the length of the shape memory alloy tube, the shrinkage deformation of the inner tube of the stainless steel cover is made easy.

In the case where the pipe coupling is used under high-pressure water, there is a risk that the stainless steel cover may be deformed by water pressure. When inert gas, pure water, oil, or the like, having no risk of corroding the shape memory alloy is enclosed in the inside of the stainless steel cover in advance, the deformation of the stainless steel cover in this case is prevented.

In the case where pipe material for underwater pipes in an underwater apparatus, a reactor pressure vessel, or the like, needs corrosion resistance, SUS304 type stainless steel, SUS316 type stainless steel, or the like, is used generally. A corrosion-resistant metallic material which is resistant against hydrogen attack, pitting corrosion, crevis corrosion, stress corrosion cracking, galvanic corrosion, etc. under water is required as the material for the cover of the shape memory alloy pipe coupling in the underwater pipe arrangement. As a corrosion-resistant metallic material adapted to this purpose, SUS304 type stainless steel or SUS316 type stainless steel is suitable. Particularly, SUS304 type stainless steel containing a small amount of carbon or SUS316 type stainless steel containing a small amount of carbon is suitable. That is, SUS304L or SUS316L containing carbon in an amount of not larger than 0.03% by weight is suitable.

As the shape memory alloy for the shape memory alloy pipe coupling, a Ti-Ni alloy containing Ni in a range of from 40% by weight to 55% by weight, and Nb in a range of from 8% by weight to 20% by weight is suitable in the point of view of shape recovery.

As metallic materials by which shape memory effect is obtained in accordance with the martensite deformation, there are two types, namely, Ni-Ti type alloy and Cu type alloy. The Ni-Ti type alloy is superior in performance, especially in repeatability. A coiled spring of the Ni-Ti type alloy can be used in combination with a general-use spring to form a bias type two-way element. In this case, an R phase (rhombohedral structure) located between a martensite phase (hereinafter referred to as "M phase") having wide deformation temperature hysteresis in heating and cooling and a high-temperature phase (CsCl type body-centered cubic structure) is utilized. The R-phase deformation is excellent in lifetime characteristic against the heat cycle, though the quantity of shape memory obtained in the R-phase deformation is small. In the case of an Ni-Ti-Cu alloy having a rhombic structure in the M phase, the temperature hysteresis, the quantity of shape memory and the lifetime characteristic thereof are intermediate between the case of R-phase deformation of the Ni-Ti alloy and the case of M-phase deformation of the Ni-Ti alloy. By utilizing this performance, the Ni-Ti-Cu alloy can be applied to the field in which lifetime of from 10,000 cycles to 20,000 cycles is required.

On the contrary, the M-phase deformation having wide temperature hysteresis is applied to a coupling, a connector, etc. using a one-way shape memory effect. Because the M-phase deformation temperature of an Ni-Ti-Fe shape memory alloy pipe coupling is considerably lower (about $-150°$ C.) than the environmental temperature, the Ni-Ti-Fe shape memory alloy pipe coupling is called "low-temperature shrinkage type". According, the pipe coupling is put in liquid nitrogen for safekeeping in a condition in which the inner diameter of the pipe coupling is widened at a low temperature. The temperature hysteresis of an Ni-Ti-Nb alloy is more wider compared with the case of M-phase deformation of the Ni-Ti alloy. By utilizing this alloy, there is obtained a heat shrinkage type pipe coupling having shape memory temperature of not lower than room temperature and capable of being put at ordinary temperature for safekeeping.

As a method for covering the surface of the shape memory alloy tube with a corrosion-resistant metallic material, there can be used: a structure in which an accommodating space is provided between respective tube portions of a double tube with the corrosion-resistant metallic material; or a method of forming a delicate coating of SUS304L or SUS316L containing carbon in an amount of not larger than 0.03% by weight on the surface of the shape memory alloy by using plasma powder deposit welding, spattering deposition, etc.; or a method of bringing a coating of SUS304L or SUS316L containing carbon in an amount of not larger than 0.03% by weight in close contact with the shape memory alloy by high-temperature pressure welding based on hot isostatic pressing.

The material for the cover is selected from ferrite type stainless steel, austenite type stainless steel, Ni-group alloy, copper alloy, titanium alloy, etc. in accordance with the environment. In the case of an underwater pipe arrangement in an underwater apparatus, a reactor pressure vessel and so on, stainless steel containing C of 0.03% by weight or less, Si of 1.0% by weight or less, Mn of 2.0% by weight or less, P of 0.04 % by weight or less, S of 0.03% by weight or less, Ni in a range of from 12% by weight to 14% by weight, Cr in a range of from 16% by weight to 18% by weight, Mo in a range of from 2% by weight to 3% by weight, and N of 0.12% by weight or less is suitable from the point of view of corrosion resistance against water. Particularly when the C content is selected to be not larger than 0.03% by weight, sensitivity for stress corrosion cracking is desirably lowered in the heat influence portion after welding particularly in high-temperature and high-pressure water. Because strength decreases as the C content decreases, addition of N in an amount of not smaller than 0.04% by weight is required for compensating the lowering of strength. Because a large amount of N spoils toughness, the N content is preferably selected to be not larger than 0.12% by weight.

It is preferable that the inside of the cover is put in a non-corrosive environment. For this purpose, gas sealing, liquid sealing, decompression, vacuum, etc. may be used.

The cover may be used in combination with the container of a double tube and aforementioned buildup welding.

As described above, according to the present invention, the pipe coupling using a shape memory alloy for the purpose of connecting unit pipes to each other in a plant has a structure in which a tube of a shape memory alloy is enclosed by a cover of a material such as stainless steel identical with the material for the unit pipes. Accordingly, there is no risk that embrittlement, corrosion and damage of the shape memory alloy tube may be caused by high-temperature water even in the case where high-temperature water is present in the inside and outside of the underwater pipe arrangement. Particularly there is no risk of galvanic corrosion. Further, because the pipe coupling is mounted onto the outside of the plant pipes, there is no risk of disturbing the flow of high-temperature water in the plant pipes. Further, a heater is mounted onto the surface of the shape memory alloy tube or onto the outer surface of the coating thereof to thereby provide an effect that the shape memory alloy tube can be heated easily.

DESCRIPTION OF THE PREFERRED EMBODIMENTS

Embodiment 1

Figure 1:
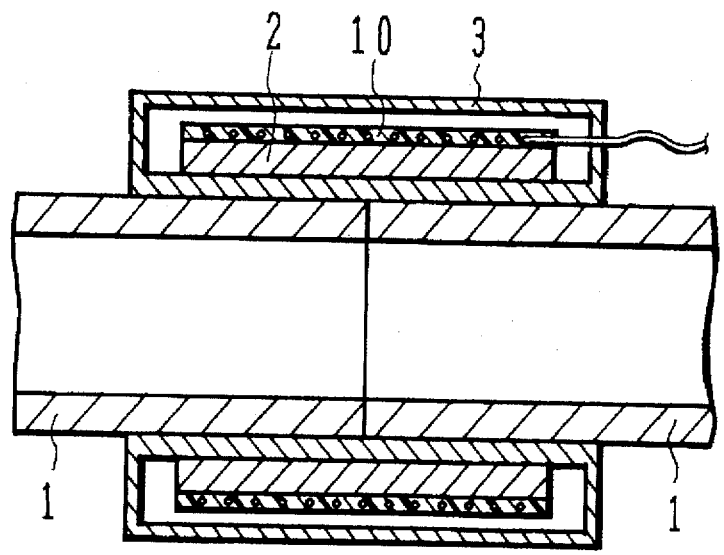
FIG. 1 is a sectional view showing the case where a pipe coupling of a shape memory alloy connects two unit pipes.

FIG. 1 is a sectional view showing the case where a pipe coupling of a shape memory alloy connects two unit pipes 1 of stainless steel. High-temperature water is present in the inside and outside of the unit pipes 1. The shape memory alloy pipe coupling comprises: a tube 2 made of a shape memory alloy containing Ni of 47.2% by weight, Nb of 14.4% by weight and the balance Ti; a heater 10 for heating the shape memory alloy tube 2; and a double tube 3 of stainless steel which serves as a cover for covering the shape memory alloy tube 2 and the heater 10. The stainless steel for the double tube 3 is composed of chemical components in weight proportion (% by weight) shown in Table 1. The shape memory alloy tube 2 is not resistant against corrosion in high-temperature water whereas the stainless steel double tube 3 is resistant against corrosion in high-temperature water.

The heater 10 in this embodiment is a sheathed heater which is rolled on the outer circumferential surface of the shape memory alloy tube 2, then fixed by a heat resisting resin from the outside. Contacting portion between the double tube 3 of stainless steel and the heater 10 is arranged to be adhered by brazing each other.

An Ni-Ti-Nb alloy and an Ni-Ti alloy are produced by electron beam melting and vacuum high-frequency melting, respectively. After hot working, a testing sample is subjected to solution treatment for one hour at 1223K in vacuum. The transformation temperature of an alloy material may be measured by differential scanning calorimetry.

TABLE 1

| Fe | C | Si | Mn | P | S | Ni | Cr | Mo | N |
|---|---|---|---|---|---|---|---|---|---|
| the balance | 0.01 | 0.2 | 1.2 | 0.01 | 0.01 | 13.9 | 17.7 | 2.5 | 0.09 |

The work of assembling the stainless steel double tube 3 is carried out after the steps of: outward expanding the shape memory alloy tube 2, that is, forcedly widening the inner diameter of the shape memory alloy tube 2 by several % when the shape memory alloy is in a martensitic state; and successively mounting the heater 10 to the outer surface of the shape memory alloy tube 2. In the last step of the work of assembling the stainless steel double tube 3, oil is injected into the double tube 3 to seal the double tube 3 at the take-out portion of the heater 10 to thereby keep the inside of the double tube 3 airtight.

Figure 2:
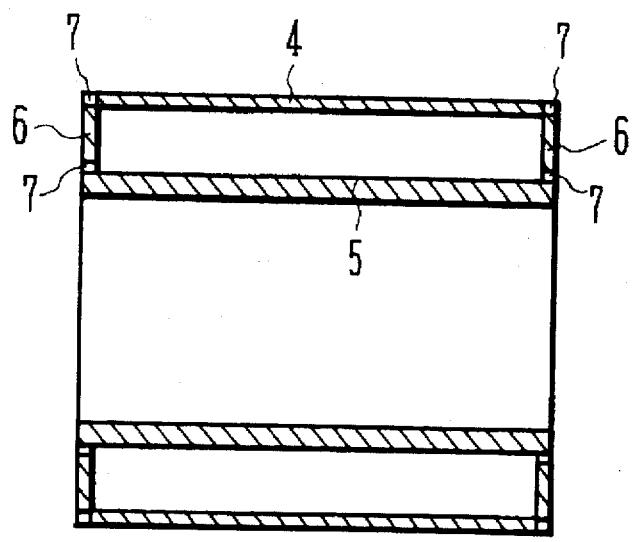
FIG. 2 is a sectional view showing a double tube.

As shown in FIG. 2, the stainless steel double tube 3 for enclosing both the shape memory alloy tube 2 and the heater 10 therein has an outer tube 4 of stainless steel, an inner tube 5 of stainless steel, end tubes 6 of stainless steel, and weld metal portions 7 formed by plasma welding and by using a filler material of the same metal.

The length of the shape memory alloy pipe coupling is selected to be in a range of from 2 times to 3 times (preferably from 2.4 times to 2.7 times) as long as the outer diameter of the pipes 1 so that the length of the pipe coupling increases as the outer diameter of the pipes 1 increases. Further, the thickness of the pipe coupling is selected to be in a range of from 1.5 times to 3 times as thick as the thickness of the pipes so that the thickness of the pipe coupling increases as the thickness of the pipes 1 increases. It is unnecessary to make the thickness of the container larger than the required thickness. In order to increase tightening force, the thickness of the container is preferably selected to be smaller.

Table 2 shows corrosion resistance in the case where a test of leaving a sample under high-temperature water of 300° C. and 100 kgf/cm² for 500 hours is given to shape memory alloy pipe couplings provided in accordance with various kinds of plant pipings being different in size.

As shown in Table 2, the shape memory alloy shows hydrogen embrittlement and galvanic corrosion in the case of a conventional pipe coupling in which the shape memory alloy is not enclosed by the stainless steel double tube, whereas neither the stainless steel double tube nor the shape memory alloy shows hydrogen embrittlement and galvanic corrosion in the case of shape memory alloy pipe couplings according to the present invention. Further, in the shape memory alloy pipe couplings according to the present invention, pitting corrosion, crevis corrosion, stress corrosion cracking and so on are not observed.

TABLE 2

| piping size | | thickness of shape memory alloy (mm) | thickness of container (mm) | occurrence of hydrogen embrittlement | occurrence of galvanic corrosion |
|---|---|---|---|---|---|
| | nominal diameter | outer diameter (mm) | | | | |
| P ¼ B | 13.8 | 6 | 1 | no | no |
| ½ B | 21.7 | 7 | 2 | no | no |
| 1 B | 34.0 | 8 | 3 | no | no |
| 1½ B | 48.6 | 9 | 4 | no | no |
| 2 B | 60.5 | 10 | 5 | no | no |
| C 1½ B | 48.6 | 8 | no container | yes | yes |

P: Present invention
C: Conventional one

TABLE 3

| piping size | | thickness of shape memory alloy (mm) | thickness of coating (mm) | occurrence of hydrogen embrittlement | occurrence of galvanic corrosion |
|---|---|---|---|---|---|
| | nominal diameter | outer diameter (mm) | | | | |
| P ¼ B | 13.8 | 6 | 0.5 | no | no |
| ½ B | 21.7 | 7 | 0.7 | no | no |
| 1 B | 34.0 | 8 | 0.9 | no | no |
| 1½ B | 48.6 | 9 | 1.1 | no | no |
| 2 B | 60.5 | 10 | 1.3 | no | no |
| C 1½ B | 48.6 | 8 | no coating | yes | yes |

P: Present Invention
C: Conventional one

Because, as shown in this embodiment, the container is not unitedly connected to the shape memory alloy, compression stress is given by the shrinkage thereof so that there is no problem in stress corrosion cracking. Further, the pipe coupling obtained in this embodiment is suitably applied to pipes in a reactor pressure vessel and very effective for prevention of hydrogen embrittlement in the case where hydrogen is injected in order to prevent corrosion of the inside of the reactor.

Embodiment 2

Figure 3:
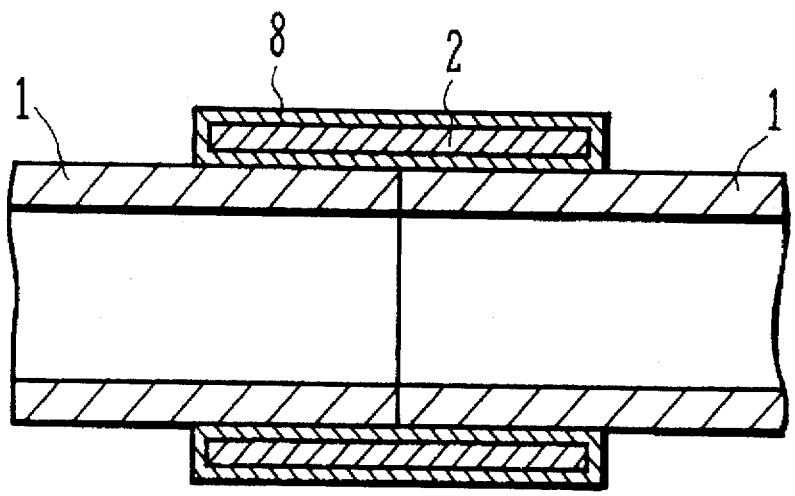
FIG. 3 is a sectional view showing the case where a pipe coupling of a shape memory alloy connects two unit pipes.

FIG. 3 is a sectional view showing the case where a pipe coupling of a shape memory alloy connects two unit pipes 1 of stainless steel. High-temperature water is present in the inside and outside of the unit pipes 1. The shape memory alloy pipe coupling comprises a tube 2 made of a shape memory alloy containing Ni of 47.2% by weight, Nb of 14.4% by weight and the balance Ti, and a stainless steel coating 8 which serves as a cover for covering the tube 2. The stainless steel for the coating 8 is composed of chemical components in weight proportion shown in Table 1 and resistant against corrosion in high-temperature water. In this embodiment, the coating 8 is formed on the surface of the shape memory alloy tube 2 by a plasma deposition welding method using stainless steel powder. After the formation of the coating 8, the shape memory alloy tube 2 is subjected to solution heat treatment at 900° C. and then subjected to outward expanding treatment.

Table 3 shows corrosion resistance in the case where a test of leaving a sample under high-temperature water of 300° C. and 100 kgf/cm² for 500 hours is given to shape memory alloy pipe couplings provided in accordance with various kinds of plant pipings being different in size.

As shown in Table 3, hydrogen embrittlement and galvanic corrosion are observed in the case of a conventional shape memory alloy pipe coupling, whereas hydrogen embrittlement and galvanic corrosion are not observed in the case of shape memory alloy pipe couplings according to the present invention. Further, in the shape memory alloy pipe couplings according to the present invention, pitting corrosion, crevis corrosion, stress corrosion cracking and so on are not observed.

In this embodiment, there arises an effect that the tightening force of the shape memory alloy tube 2 is increased, because the thickness of the coating 8 in this embodiment is smaller than the thickness of the double tube 3 in the previous embodiment.

Figure 4:
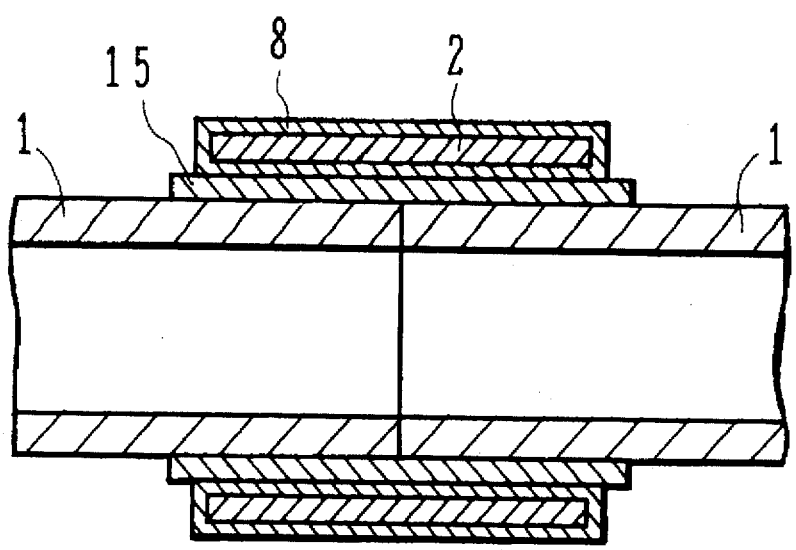
FIG. 4 is a sectional view showing a supporting tube disposed between a coating and pipes.

Because, as shown in Table 3, the thickness of the coating 8 is smaller than the thickness of the double tube shown in FIG. 1, there is a risk that the coating 8 may be broken at the joint portion of the unit pipes 1 in the case where the unit pipes 1 vibrate. As shown in FIG. 4, therefore, a supporting tube 15 of stainless steel composed of chemical components in weight proportion shown in Table 1 is preferably disposed between the coating 8 and the unit pipes 1 in order to prevent the coating 8 from breaking.

Embodiment 3

Figure 5:
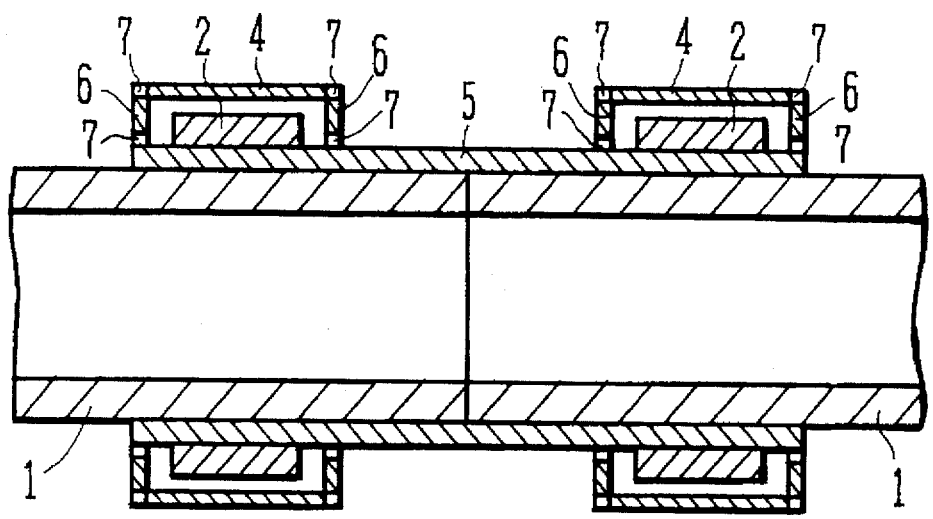
FIG. 5 is a sectional view showing the case where a pipe coupling of a shape memory alloy connects two unit pipes.

FIG. 5 is a sectional view showing the case where a pipe coupling of a shape memory alloy connects two unit pipes 1 of stainless steel. High-temperature water is present in the inside and outside of the unit pipes 1. The shape memory alloy pipe coupling has an inner tube 5, and two tubes 2 of a shape memory alloy composed of chemical components as described above. The shape memory alloy tubes 2 are isolated from high-temperature water in the outside of the pipes 1 by outer tubes 4, end tubes 6 and weld metal portions 7 which enclose the heat recoverable metallic tubes 2. That is, the inner tube 5 of the double tube which is a member coming in contact with the unit pipes 1 is formed so as to be long in the axial direction, so that the aforementioned pair of tubes 2 made of a shape memory alloy and covered with the aforementioned covers are provided substantially at opposite end portions of the inner tube 5 in the axial direction. As material for the inner tube 5, outer tubes 4, end tubes 6 and weld metal portions 7, stainless steel composed of chemical components shown in Table 1 and having corrosion resistant against high-temperature water is used. The production of the stainless steel covers for enclosing the shape memory alloy tubes 2 respectively is carried out after the treatment of outward expanding the shape memory alloy, that is, the treatment of forcedly widening the inner diameter of the shape memory alloy tubes 2 by several % when the shape memory alloy is in a martensitic state.

In the shape memory alloy pipe coupling in this embodiment, like Embodiment 1, hydrogen embrittlement, galvanic corrosion, pitting corrosion, crevis corrosion, stress corrosion cracking and so on are not observed.

Embodiment 4

Figure 6:
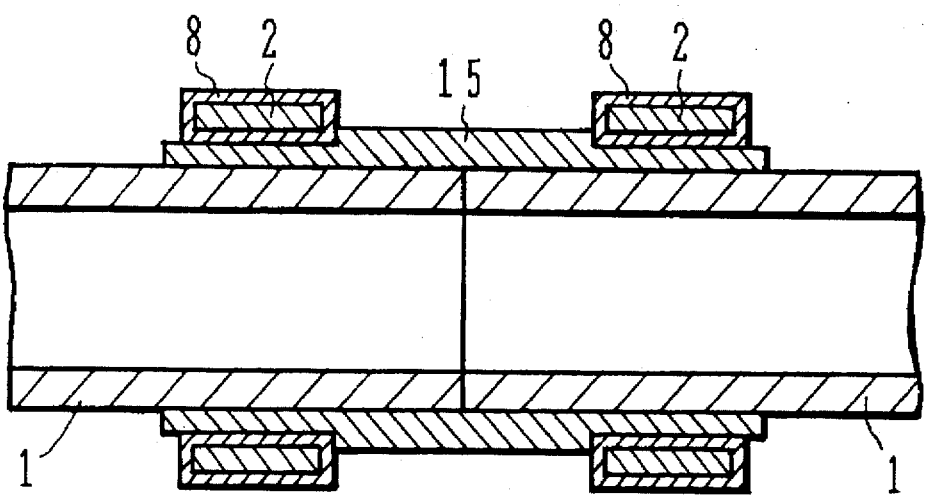
FIG. 6 is a sectional view showing the case where a pipe coupling of a shape memory alloy connects two unit pipes.

FIG. 6 is a sectional view showing the case where a pipe coupling of a shape memory alloy connects two unit pipes 1 of stainless steel. High-temperature water is present in the inside and outside of the unit pipes 1. The shape memory alloy pipe coupling has a supporting tube 15 of stainless steel, and two tubes 2 of a shape memory alloy containing Ni of 47.2% by weight, Nb of 14.4% by weight and the balance Ti. The shape memory alloy tubes 2 are isolated from high-temperature water in the outside of the pipes 1 by coatings 8 which cover the tubes 2 respectively. As material for the coatings 8, stainless steel composed of chemical components shown in Table 1 and being resistant against corrosion in high-temperature water is used.

In this embodiment, the coatings 8 are formed on the respective surfaces of the shape memory alloy tubes 2 by a plasma buildup welding method using stainless steel powder composed of chemical components shown in Table 1. After the formation of the coatings 8, the shape memory alloy tubes 2 are subjected to solution treatment at 900° C. and then subjected to outward expanding treatment. After the shape memory alloy tubes 2 are subjected to the outward expanding treatment, the shape memory alloy tubes 2 covered with the coatings 8 respectively are mounted onto the stainless steel supporting tube 15 thus to complete the piping coupling.

In the shape memory alloy pipe coupling in this embodiment, like Embodiment 2, hydrogen embrittlement, galvanic corrosion, pitting corrosion, crevis corrosion, stress corrosion cracking and so on are not observed.

Figure 7:
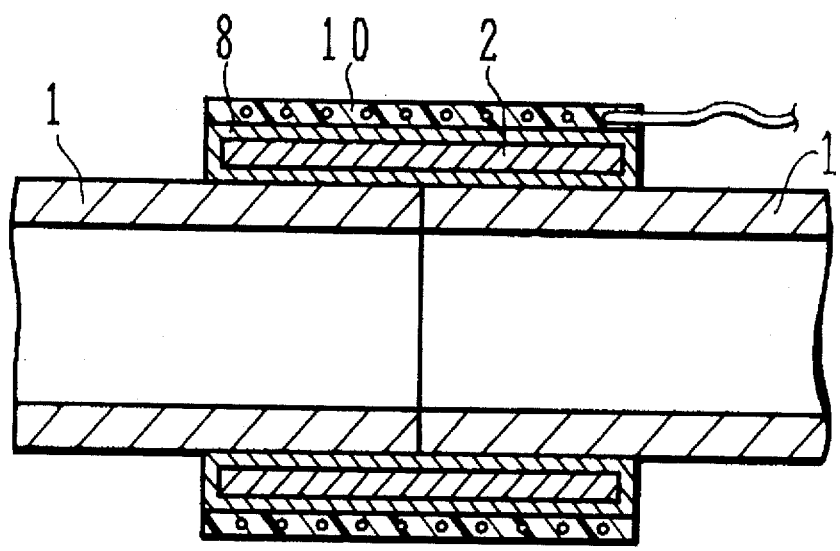
FIG. 7 shows a modification of the embodiment shown in FIG. 3.

FIG. 7 shows a modification of the embodiment shown in FIG. 3. FIG. 3 shows the case where a heater (not shown) for heating the shape memory alloy tube 2 is provided separately from the pipe coupling, whereas FIG. 7 shows the case where a heater is unitedly mounted to the outer surface of the coating. By the structure in which the heater is unitedly mounted to the outer surface of the coating, pipe connection in a narrow space is made easy.

Embodiment 5

Figure 8:
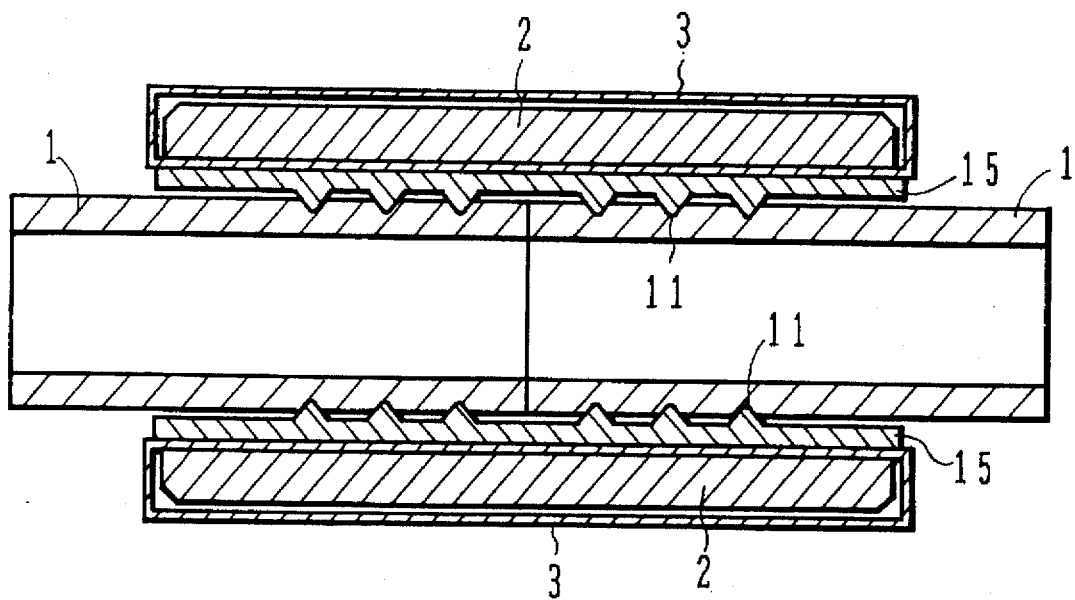
FIG. 8 is a sectional view showing the case where a pipe coupling of a shape memory alloy connects two unit pipes.

FIG. 8 is a sectional view showing the case where a pipe coupling of a shape memory alloy connects two pipes. The shape memory alloy pipe coupling has the same structure as in Embodiment 1 except that the heater 10 in Embodiment 1 is removed, and the shape memory alloy pipe coupling is formed in the same manner as in Embodiment 1. In this embodiment, a supporting tube 15 made of an alloy shown in Table 1 is used in the inner circumferential side of the pipe coupling. Three convex portions 11 are formed in each of opposite sides of the piping so that the convex portions are provided on the inner circumferential surface of the supporting tube 15 in accordance with concave portions provided in the pipes. The convex portions 11 are provided so that the pipes can be connected to each other enough tightly to prevent both loosening of the pipes in the axial direction and leaking of a medium into the pipes. Further, in this embodiment, the pipe coupling has a structure by which the pipes are joined tightly to each other through the concave portions of the pipes and the convex portions 11 of the pipe coupling. Accordingly, the pipe coupling is formed so that force does not directly act on the outer circumferential surfaces of the pipes 1 and the inner circumferential surface of the pipe coupling 1. By such a structure, a fluid such as liquid, gas, etc. is prevented from leaking to the outside even in the case where leaking of the fluid occurs at the joint portion of the pipes. That is, the pipe coupling has a structure in which the respective ends of the convex portions 11 of the pipe coupling are plastically self-deformed or has a structure in which the respective ends of the convex portions 11 are arranged at a slightly sharp angle so as to be self-pushed into the concave portions of the pipes 1.

The degree of hydrogen embrittlement, the degree of corrosion and the degree of stress corrosion cracking in this embodiment are the same as those in the previous embodiment. Furthermore, as a result of a leaking test using air pressure of 0.5 MPa and as a result of a leaking test using water pressure of 30 MPa, there is no leaking observed.

Embodiment 6

Figure 9:
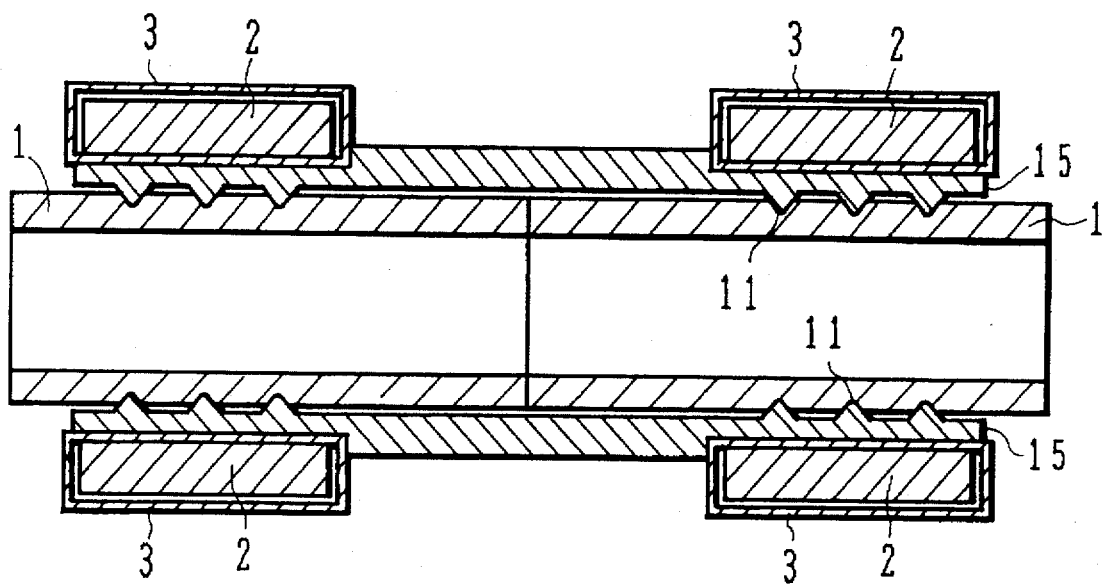
FIG. 9 is a sectional view showing the case where pipes are joined to each other by using two pipe couplings of a shape memory alloy.

FIG. 9 is a sectional view showing the case where pipes are joined to each other by using two pipe couplings of a shape memory alloy. This embodiment has the same structure as in Embodiment 5, except that two pipe couplings are used in this embodiment. The pipe coupling are disposed in opposite sides of the piping so as to be symmetric to each other in the left and right.

Also in this embodiment, the degree of hydrogen embrittlement, the degree of corrosion and the degree of stress corrosion cracking are the same as those in the previous embodiment.

What is claimed is:

1. A shape memory alloy pipe coupling comprising:
   a tube made of a shape memory alloy;
   and a cover formed by a coating, molded so as to contact and adhere on the whole surface of said tube wherein said cover prevents contact of a corrosive fluid with said tube;
   wherein said cover comprises SUS304L stainless steel.

2. The shape memory alloy pipe coupling of claim 1 wherein said tube has a diameter which is shrunk by heating.

3. The shape memory alloy pipe coupling of claim 1 further comprising a heating means adjoined to the outer surface of said tube.

4. The shape memory alloy pipe coupling of claim 1 wherein said tube made of shape memory alloy is included in a composite pipe, and further comprises a supporting tube provided in an inner circumferential surface of said composite pipe and having an inner diameter substantially equal to the outer diameter of the pipes to be joined.

5. The shape memory alloy pipe coupling of claim 4 wherein said supporting tube, said cover and pipes to be joined are made of stainless steel.

6. The shape memory alloy pipe coupling of claim 4 wherein said supporting tube and said cover are comprised of austenitic stainless steel containing carbon in a range of from about 0.001% by weight to about 0.03% by weight.

7. The shape memory alloy pipe coupling of claim 1 wherein said tube has a thickness in the range of about 2 mm to about 20 mm.

8. The shape memory alloy pipe coupling of claim 1 wherein said cover has a thickness in the range of about 0.1 mm to about 5 mm.

9. The shape memory alloy pipe coupling of claim 1 wherein said cover is comprised of austentic stainless steel containing carbon in a range of from about 0.001% by weight to about 0.03% by weight.

10. A shape memory alloy pipe coupling according to claim 1, wherein the ratio of the thickness of said tube to the thickness of said cover is between about one fourth and about one twelfth.

11. A shape memory alloy pipe coupling according to claim 1, wherein said cover comprises SUS316L stainless steel and does not comprise SUS304L stainless steel.

12. A shape memory alloy pipe coupling according to claim 1, wherein said cover comprises stainless steel containing C of not more than 0.03% by weight, Si of not more than 1.0% by weight, Mn of not more than 2.0% by weight, Ni of from 12 to 14% by weight, Cr of from 16 to 18% by weight, Mo of from 2 to 3% by weight, N of not more than 0.12% by weight and the balance Fe and does not comprise SUS304L stainless steel.

13. An underwater pipe arrangement utilizing a pipe coupling for tightening and joining pipes of stainless steel therethrough from an outside and capable of being disposed in a place where water exists in an inside or outside of said pipes, said pipe coupling including:

a tube made of a shape memory alloy and having a diameter which is shrunk by heating and a thickness of from 2 mm to 20 mm;

and a cover formed by a coating, molded so as to contact and adhered on the whole surface of said tube and comprising SUS304L stainless steel, and having a thickness in a range from 0.1 mm to 5 mm.

14. An underwriter pipe arrangement according to claim 13, wherein said cover comprises SUS316L stainless steel and does not comprise SUS304L stainless steel.

15. An underwater pipe arrangement according to claim 13, wherein said cover comprises stainless steel containing C of not more than 0.03% by weight, Si of not more than 1.0% by weight, Mn of not more than 2.0% by weight, Ni of from 12 to 14% by weight, Cr of from 16 to 18% by weight, Mo of from 2 to 3% by weight, N of not more than 0.12% by weight, and the balance Fe and does not comprise SUS304L stainless steel.

* * * * *